(12) United States Patent
Leclair et al.

(10) Patent No.: US 7,069,341 B2
(45) Date of Patent: Jun. 27, 2006

(54) METHOD AND APPARATUS FOR CONTROLLING AN INPUT OR OUTPUT DEVICE OVER THE INTERNET

(75) Inventors: Gregory A. Leclair, San Jose, CA (US); Babulal J. Thummar, Milpitas, CA (US)

(73) Assignee: Seiko Epson Corporation, Tokyo (JP)

( * ) Notice: Subject to any disclaimer, the term of this patent is extended or adjusted under 35 U.S.C. 154(b) by 611 days.

(21) Appl. No.: 10/117,874

(22) Filed: Apr. 8, 2002

(65) Prior Publication Data

US 2002/0109861 A1    Aug. 15, 2002

Related U.S. Application Data

(62) Division of application No. 09/187,193, filed on Nov. 6, 1998, now Pat. No. 6,636,891.

(51) Int. Cl.
   G06F 3/12      (2006.01)
   G06F 15/16     (2006.01)
(52) U.S. Cl. ............ 709/246; 709/246; 358/1.15
(58) Field of Classification Search ........... 709/208; 715/523; 358/1.15
   See application file for complete search history.

(56) References Cited

U.S. PATENT DOCUMENTS

| 5,450,571 A | 9/1995 | Rosekrans et al. ......... 358/1.13 |
| 5,602,974 A | 2/1997 | Shaw et al. ................ 358/1.15 |
| 5,699,495 A | 12/1997 | Snipp .................... 358/1.15 |
| 5,822,507 A | 10/1998 | Uda et al. ................ 358/1.15 |
| 5,898,821 A | 4/1999 | Brandkamp ............. 358/3.06 |
| 5,982,996 A * | 11/1999 | Snyders ................. 358/1.15 |
| 5,995,723 A | 11/1999 | Sperry et al. ............ 358/1.15 |
| 6,020,973 A | 2/2000 | Levine et al. ............ 358/1.15 |
| 6,085,227 A | 7/2000 | Edlund et al. ........... 709/203 |
| 6,092,078 A | 7/2000 | Adolfsson ............... 707/102 |
| 6,119,137 A * | 9/2000 | Smith et al. ............. 715/523 |
| 6,184,996 B1 * | 2/2001 | Gase ..................... 358/1.15 |
| 6,266,160 B1 | 7/2001 | Saito et al. ............... 358/407 |
| 6,327,045 B1 * | 12/2001 | Teng et al. .............. 358/1.15 |
| 6,453,127 B1 * | 9/2002 | Wood et al. ............. 358/1.15 |

FOREIGN PATENT DOCUMENTS

| EP | 0 835 011 | 4/1998 |
| EP | 0 854 415 A2 | 7/1998 |
| EP | 0 860 985 | 8/1998 |

(Continued)

OTHER PUBLICATIONS

"Lantech Ethernet Print Servers", available electronically at: http://www.net-shop.com.uk/technota.lps2a.htm.

(Continued)

*Primary Examiner*—Patrice Winder

(57) ABSTRACT

In a network having an initiator, a server, and an input/output (I/O) device remote from the initiator, the initiator transmits to the server a request containing the network location of data to be retrieved from an input device, such as a video camera, fax, or scanner, or output by an output device, such as a printer. Output requests are placed in a queue and scheduled for completion. When an output device is ready, the server retrieves the data from a network storage location different from the queue and transmits the data to the printer or output device for action. When an input device is ready, the server retrieves the data from the input device and transmits it to a network location based on the request. The server can also provide the initiator with status information about the request and the input or output device.

35 Claims, 10 Drawing Sheets

FOREIGN PATENT DOCUMENTS

| | | |
|---|---|---|
| EP | 0 872 792 | 10/1998 |
| EP | 0 886 206 | 12/1998 |
| JP | 5-292240 | 11/1993 |
| JP | 10-275063 | 10/1998 |
| WO | WO 98/56163 | 12/1998 |
| WO | WO 99/18534 | 4/1999 |

OTHER PUBLICATIONS

"Axis Print Server for Windows", available electronically at: http://www.net-shop.co.uk/technota/nps150a.htm.

"Axis MultiProtocal Ethernet Print Server", available electronically at: http://www.net-shop.co.uk/technota/nps560a.htm.

IBM BookManager®BookServer, "IPDS Reference", available Sections 1.1, 1.2 available electronically at: http://ppdbooks.pok.ibm.com:80/cgi . . . mgr/bookmgr.cmd, 1987, 1996, 4 pgs.

R. M. Adler, "Distributed Coordination Models For Client/Server Computing", IEEE Computer Society, vol. 28, No. 4, Apr. 1, 1995, pp. 14-22, XP000507856.

Larry L. Peterson, "A Yellow-Pages Service For A Local-Area Network", Computer Communications Review, Association For Computing Machinery, vol. 17, No. 5, Aug. 1, 1988, pp. 235-242, XP-002061706.

* cited by examiner

METHOD AND APPARATUS FOR CONTROLLING AN INPUT OR OUTPUT DEVICE OVER THE INTERNET

CONTINUING APPLICATION DATA

This application is a divisional of Ser. No. 09/187,193, filed Nov. 6, 1998, now U.S. Pat. No. 6,636,891 B1 the contents of which are incorporated herein by reference.

BACKGROUND OF THE INVENTION

Field of the Invention

This invention relates generally to methods and apparatus for transmitting data to, and receiving data from, an output or input device over a computer network.

The introduction of networks, such as LANs, WANs, and the Internet, has revolutionized the field of computing and, in particularly, the field of data transfer (i.e. inputting and outputting data) between devices. Early computer workstations included a personal computer electrically connected to input and output devices, such as printers, scanners, fax machines, and video cameras. Today, networks allow multiple computer workstations or personal computers (collectively called "clients") to share input or output devices.

To share resources across a network, the resources must be able to communicate using the same or compatible protocols. Conventional networks are organized as a series of layers, the numbers, names, contents, and function of which differ from network to network. In most conventional networks, however, each layer offers services to the higher layers while shielding those layers from the details of how the offered services are actually implemented. When machines communicate, the layers on each machine can communicate with an equivalent layer on other machines using the appropriate protocol for that layer. The protocols used by the layers of a system is referred to as a "protocol stack" and define the network environment. In an UNIX environment, for example, the Transmission Control Protocol/Internet Protocol (TCP/IP) protocol stack includes the transmission control protocol (TCP) and Internet protocol (IP). Server Message Block (SMB) is a protocol stack for passing information between network computers for processing by a device. The TCP/IP protocol stack is one of the most common protocols used on the Internet.

FIG. 1 shows a conventional printing system including multiple clients and a shared printing device. Clients 105, 110, and 115 are connected via network 118 to a shared server 120 and printer 135. Any of clients 105, 110, and 115 may use printer 135 via server 120. If client 105 wants to print, for example, it sends, or "pushes," a print job consisting of print commands and print data over network 118 to server 120. Server 120 stores the print job to a disk, queue, or "spool," 125 in server 120. As a print job percolates to the top of the print queue, print controller 130 reads the stored file from spool 125 and transmits the file to printer 135. Print controller 130 also sends commands to printer 135. In response, printer 135 processes the received file.

This conventional "push" technology has some limitations. In a conventional printing system, for example, clients transmit command information as well as a digital copy of the output file across the network to the server. The server 120 must therefore have sufficient disk space in the spool 124 to store the print jobs waiting to be printed. In networks with many clients, the server requires large amounts of costly disk space, and may delay accepting new jobs if the disk's spool has reached its maximum storage capacity. When the spool is full, the client may waste time querying the server and waiting for it to have sufficient space to receive the job. Furthermore, the client may be inoperable for other tasks until the server can process the job, which can be a significant period of time if the output file is very large.

Additionally, in a conventional configuration, access to printers by clients will frequently be determined by chance and can be unfair. When a server rejects print jobs because the spool is full, clients wishing to output to a device controlled by that server may not be accepted in a predetermined order, but may have to keep querying the server hoping that its request arrives before the those of other clients when the server becomes available.

Furthermore, network print servers that receive requests to print from clients on a variety of platforms require multiple protocols and are more difficult to implement and troubleshoot. A platform is any piece of hardware plus its software operating system. FIG. 2 illustrates a conventional print server 210 that receives print requests from clients 220, 240, and 250, each operating on a different platform. Client 230 may be an Apple Macintosh using the MacOS® operating system, client 240 may be a PC using the UNIX operating system, and client 250 may be a PC operating the Windows 95® operating system. A server that accepts print jobs from clients on different platforms requires multiple protocol stacks to interpret and output the print request. For example, as shown in FIG. 2, print server 210 must contain TCP/IP 214, SMB 216, and PAP (Printer Access Protocol) 212 protocol stacks to communicate with the various clients 230, 240, and 250 on the network. A server that must be configured to use a multitude of protocols is very complex, requiring additional time and resources to develop, troubleshoot, and maintain.

In addition, many conventional methods of printing using a network server do not allow a client to receive information about some status conditions. For example, in a conventional setting, once the client sends a print job to the print server, the client can only query the printer server for the status of the print job (such as whether it is currently printing or place in the print queue), but not for the status of the output device (such as amount of paper left in tray, etc.). Those systems that do allow full bidirectional querying of printer status require specific hardware or licensed software. For example, IBM Corporation offers its Intelligent Printer Data Stream (IPDS) product that purportedly contains a command set for querying a printer for status information. The printer, however, must support the IPDS printer interface that recognizes a set of specially designed command sets in the IPDS architecture.

SUMMARY OF THE INVENTION

Consistent with this invention, in a network comprising an initiator, a server, and an output device, a server receives from an initiator a request comprising a network storage location of data to be output using the output device. The server places the request in a queue and schedules an output action based on the request. When the scheduled action is ready to be implemented, the server retrieves the output data from the network storage location which is different from the queue. A computer-readable medium consistent with the present invention contains instructions for outputting data in a network corresponding to tasks executable by a computer and performed by the server.

Another method for receiving data from an input device in a network consistent with this invention comprises the following operations, performed by the server. The server receives from input job information from an input device. The server stores the input job information to an input queue. The server receives a request from an initiator to process data from the input device based on the input job information. The server retrieves data from the input device based on the request and transmits the data to a location based on the data destination information. A computer-readable medium consistent with the present invention contains instructions for retrieving data from an input device in a network corresponding to tasks executable by a computer and performed by the server.

A network printer consistent with the present invention comprises a print mechanism for outputting data provided by the initiator. The network printer also comprises a controller for receiving from the initiator a request comprising the network storage location of data to be printed, placing the request in a queue, and scheduling the data to be printed based on the request. When the data is scheduled to be printed, the server retrieves the data from a location different from the queue, and transmits the data to the print mechanism.

An apparatus for controlling data in a network consistent with the present invention comprises a memory having program instructions; and a processor configured to receive a request from an initiator to output data provided by the initiator using the output device, the request comprising a network storage location of data to be output; place the request in a queue; schedule an output action based on the request in the queue, and retrieve the output data from the network storage location based on the request when the scheduled action is ready to be implemented, wherein the network storage location of the output data is different from the queue.

A further apparatus for controlling data in a network comprises a memory having program instructions; and a processor configured to receive input job information from an input device; store the input job information to an input queue; receive a request from an initiator to process data from the input device based on the input job information; and retrieve data from the input device based on the input job information when the input device is available.

Consistent with the present invention, a data control system comprises an initiator that transmits a request comprising a network storage location of data provided by the initiator to be output using the output device. A server receives the request, places the request in a queue, and schedules an action based on the request. When the scheduled action is ready to be implemented, the server retrieves the data from the network storage location which is different from the queue. The server may also retrieve input job information from an input device and retrieve data from an input device based on the input job information when the input device is available.

A network output device in a network comprises an output mechanism; a memory having program instructions; and a processor configured to receive a request from an initiator to output data provided by the initiator using the output device, the request comprising a network storage location of data to be output; place the request in a queue; schedule an output action based on the request in the queue, and retrieve the output data from the network storage location based on the request when the scheduled action is ready to be implemented, wherein the network storage location of the output data is different from the queue.

A network input device comprises a data input mechanism; a memory having program instructions; and a processor configured to receive input job information from an input device; store the input job information to an input queue; receive a request from an initiator to process data from the input device based on the input job information; and retrieve data from the input device based on the input job information when the input device is available.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings.

DESCRIPTION OF THE PREFERRED EMBODIMENTS

Systems and methods consistent with the present invention operate in a network environment that has a client acting as an initiator of a transaction, a server, and an I/O device. In general, an initiator requests a server to perform an input/output transaction and negotiates the specifics of the transaction with the server. When the request from the initiator is ready to be executed, the server retrieves, or "pulls," the data from one location and sends it to another.

One system and method consistent with the present invention uses the standard Web transfer protocol, HTTP. The HTTP protocol operates well over many different physical links and is a popular protocol for transferring various types of information between devices on a network. Implementation of the HTTP protocol reduces the need for the server to contain multiple protocol stacks for translating requests from initiators on different platforms. Reducing the number of protocol stacks in the server reduces complexity of the device thereby reducing development, testing, and troubleshooting time.

Reference will now be made in detail to implementations consistent with the principles of the present invention as illustrated in the accompanying drawings. Wherever possible, the same reference numbers will be used throughout the drawings and the following description to refer to the same or like parts.

A. Architecture

Systems and methods consistent with the present invention may be implemented using a variety of architectures that will be described in more detail below. In general, the systems will comprise an initiator, a server, and an I/O mechanism connected via a network. As will be described below, the I/O mechanism may be a "thin" device attached to the network, server, or client. A "thin" device is one that performs most I/O operations and stores most data on a server. The I/O mechanism may also be collocated in the same device as an additional server such as, for example, a conventional printer with embedded server.

Figure 1:
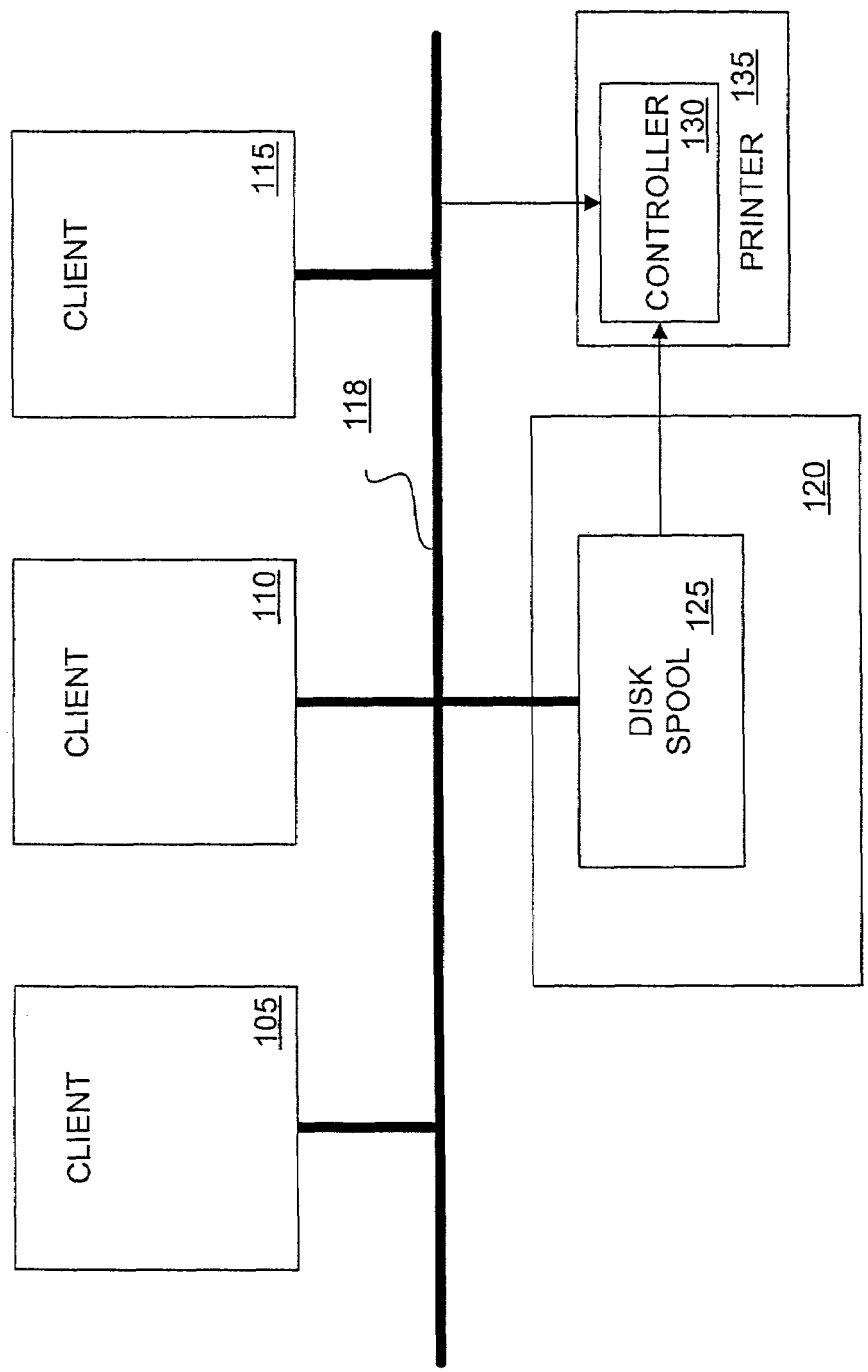
FIG. 1 is an illustration of a conventional network comprising clients, a printer, and a print server.
Figure 2:
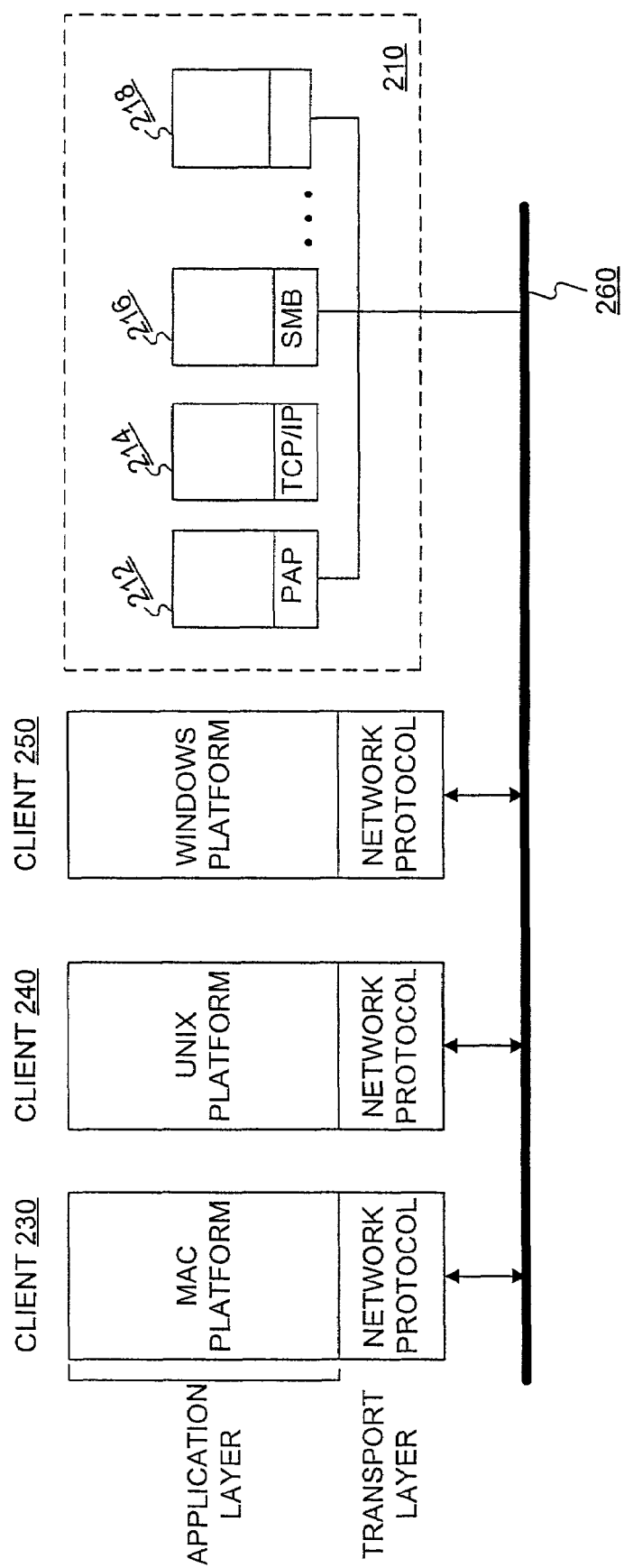
FIG. 2 illustrates a conventional print server.
Figure 3:
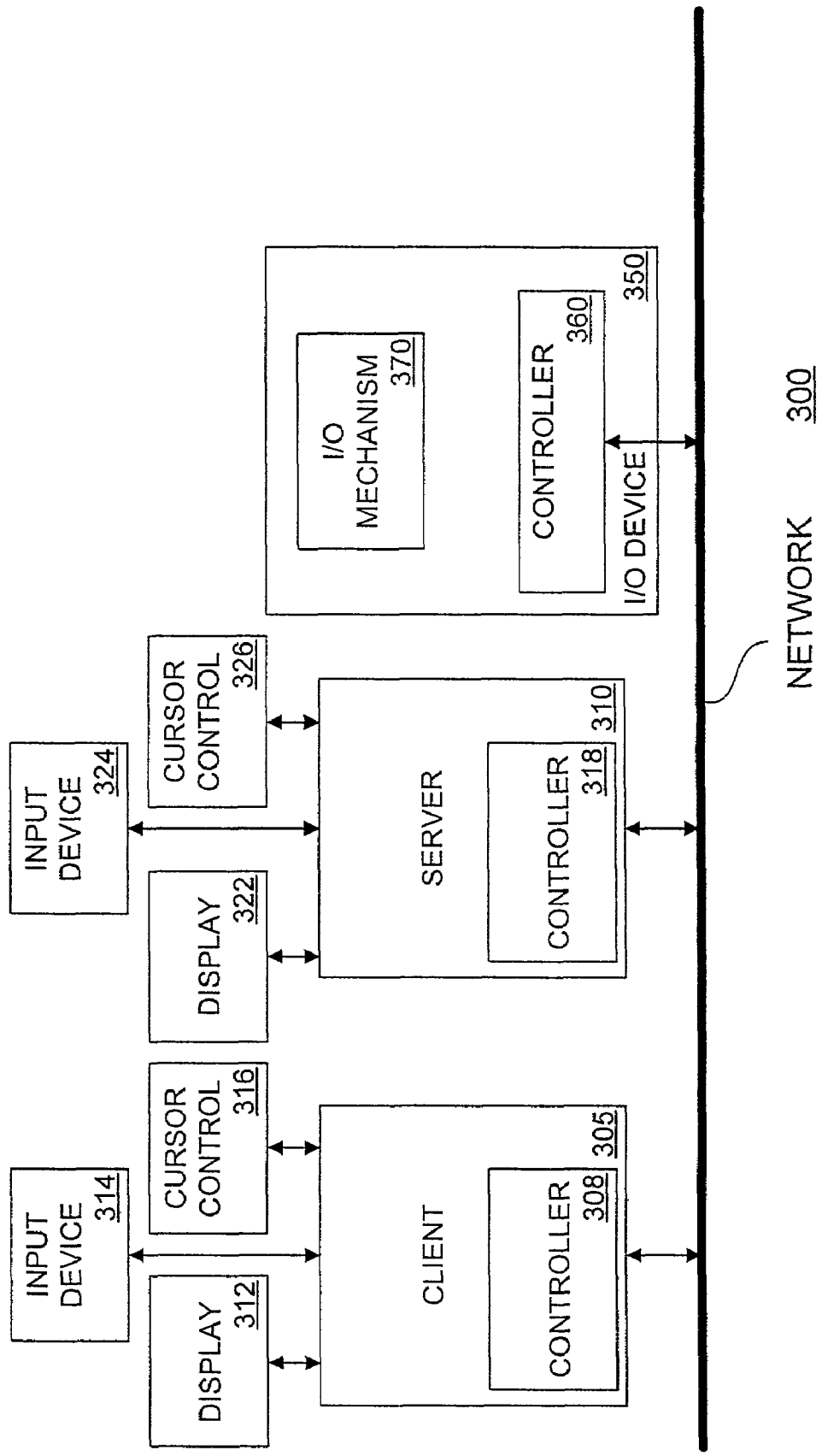
FIG. 3 shows a system consistent with the present invention.

FIG. 3 is a block diagram that illustrates an I/O system consistent with the present invention. As shown in FIG. 3, the I/O system comprises a client 305 acting as an initiator, a server 310, and an I/O device 350 capable of communicating with one another through network 300. Network 300 may be a LAN, WAN, or Internet comprising multiple LANs and WANs. Network 300 uses electric, electromagnetic, radio frequency, and/or optical signals to carry digital data streams. The signals that carry digital data through network 300 to and from client 305, server 310, and I/O device 350 are exemplary forms of carrier waves.

Client 305 and server 310 can send messages and receive data, including program code, through the network 300. For example, client 305 might transmit a request to download code for an application program to server 310, or server 310 may download the code to client 305 through network 300. One such downloaded application may be an input/output driver program, as described herein. In this manner, client 305 may obtain application code in the form of a carrier wave. For example, the application code may be encoded and transmitted as packets on a carrier wave.

Figure 4:
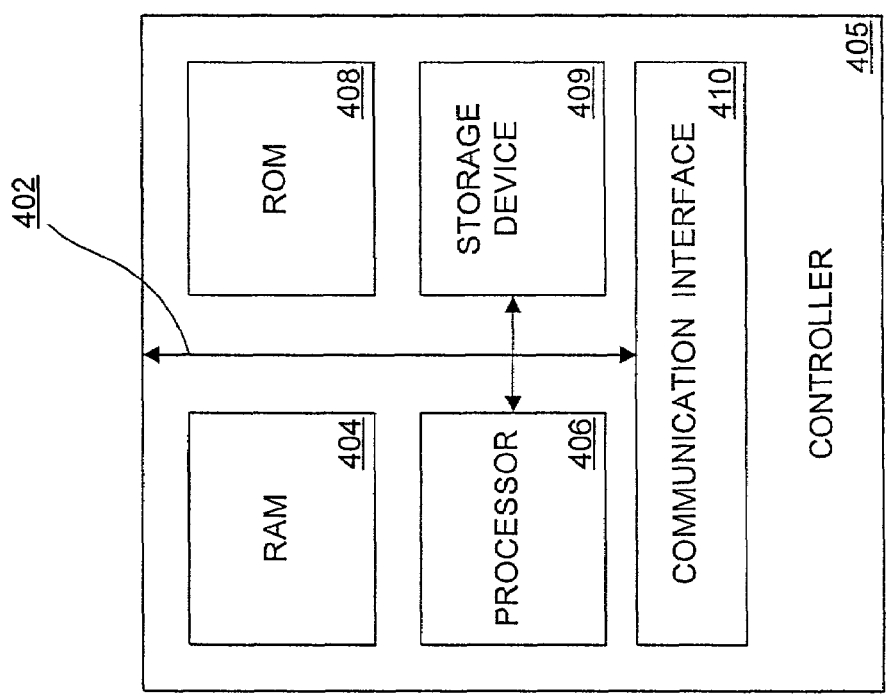
FIG. 4 shows a controller consistent with the present invention.

In FIG. 3, both client 305 and server 310 contain controllers 308 and 318, respectively, similar to controller 405 as shown in FIG. 4. Controller 405 contains a processor 406, RAM 404, ROM 408, storage device 409, and communication interface 410 capable of communicating via bus 402. Processor 406 is a conventional microprocessor unit. RAM 404 can be a static or dynamic storage device, and stores information, temporary variables, and instructions to be executed by processor 406. ROM 408, which can be any type of nonvolatile static storage device appropriate to the task, stores static information and instructions for processor 406. A storage device 410, such as a magnetic disk or optical disk, is provided and coupled to bus 402 for storing information and instructions.

Controller 405 also includes a communication interface 410 coupled to bus 402. Communication interface 410 provides a two-way data communication coupling to a network. For example, communication interface 410 may be an ISDN card, cable modem, or a modem to provide a data communication connection to a corresponding type of telephone line. As another example, communication interface 410 may be a LAN card that provides a data communication connection to a compatible LAN. Wireless links may also be implemented. In any such implementation, communication interface 410 sends and receives electrical, electromagnetic or optical signals that carry digital data streams representing various types of information.

Consistent with one implementation of the invention, processor 406 executes one or more sequences of instructions in ROM 408. Executing the sequences of instructions in memory ROM 408 causes processor 406 to perform the method for controlling access to a I/O device described below. Alternatively, hard-wired circuitry may be used in place of or in combination with software instructions. Systems and methods consistent with the present invention are not limited to any specific combination of hardware circuitry and software.

The term "computer-readable medium" as used herein refers to any media that participates in providing instructions to processor 406 for execution. Such a medium may take many forms, including but not limited to, non-volatile media, volatile media, and transmission media. Non-volatile media includes, for example, optical or magnetic disks, such as ROM 408. Volatile media includes dynamic memory, such as RAM 404. Transmission media includes coaxial cables, copper wire, and fiber optics, including bus 402. Transmission media can also take the form of acoustic or light waves, such as those generated during radio-wave and infra-red data communications. Common forms of computer-readable media include a floppy disk, a flexible disk, hard disk, magnetic tape, or any other magnetic medium, a CD-ROM, any other optical medium, punch cards, paper-tape, any other physical medium with patterns of holes, a RAM, PROM, and EPROM, a FLASH-EPROM, any other memory chip or cartridge, a carrier wave as described above, or any other medium from which a computer can read data.

Various forms of computer readable media may be involved in carrying the instructions to processor 406 for execution. For example, the instructions may initially be carried on magnetic disk of a remote computer. The remote computer can load the instructions into its dynamic memory and send the instructions over a telephone line using a modem. A modem local to controller 405 can receive the data on the telephone line and use an infrared transmitter to convert the data to an infrared signal. An infrared detector coupled to bus 402 can receive the data carried in that signal and place the data on bus 402. Bus 402 carries the data to ROM 408, from which processor 406 retrieves and executes the instructions. The instructions received by processor 406 may also be stored on storage device 409 either before or after execution by processor 406.

Referring again to FIG. 3, client 305 and server 310 may be conventional PCs containing controllers 308 and 318, respectively. In addition, client 305 and server 310 may contain attached peripherals, such as displays, input devices, and devices for cursor control. In FIG. 3, client 305 is shown coupled via standard bus to display 312, input device 314, and cursor control 316. Server 310 is shown coupled via standard bus to display 322, input device 324, and cursor control 326. Displays 312 and 322 may be any conventional display device used for displaying information to a computer user, such as a CRT, LCD, LED, or custom display device. In addition, input devices 314 and 324 are devices, such as keyboards, that include alphanumeric and other keys for communicating information and command selections to client 305 and server 310. Another type of user input device is cursor control 316 and 326, such as a mouse, a trackball or cursor direction keys for communicating direction information and command selections to client 305 and server 310 and for controlling cursor movement on displays 312 and 322.

I/O device 350 may be an output device, such as a printer, or an input device, such as a scanner or digital camera. As shown in FIG. 3, I/O device 350 can include a controller 360 and an I/O mechanism 370. Controller 360 may be similar to controller 405 in FIG. 4, or may contain a smaller RAM, ROM, or storage device, or a processor with different capabilities. I/O mechanism 370 inputs or outputs data. If I/O device 350 is a laser printer, for example, I/O mechanism 370 may be a printer engine unit that converts data to printed pages. Pages can contain various types of content (such as text or graphics) and can be marked with a variety of compounds (such as ink, toner, heat, light, finisher, or pressure). Examples of output devices include printers, such as the Epson Stylus Color 5000. If I/O device 350 is an input device such a scanner, for example, I/O mechanism 370 may be a scan converter that converts printed information to digital data such as, for example, an Epson Scanner model ES-8000C.

Another example of an I/O system consistent with the present invention comprises a client 305 and I/O device 350. In this example, I/O device 350 comprises an embedded controller 360 that is similar to controller 405 illustrated in FIG. 4. Controller 360 then would perform both its own functions and those performed by controller 318 of server 310 in the embodiment described above. In this example, I/O device 350 may be an output device, such as a printer, or an input device, such as a scanner or digital camera with an enhanced controller. I/O device 350 may also be a conventional I/O device with an additional peripheral device, such as a PC Card. I/O device 350 can also contain only an I/O mechanism 370. In this embodiment, I/O device 350 will be physically connected to a device with a controller, such as client 305 or server 310.

Figure 5:
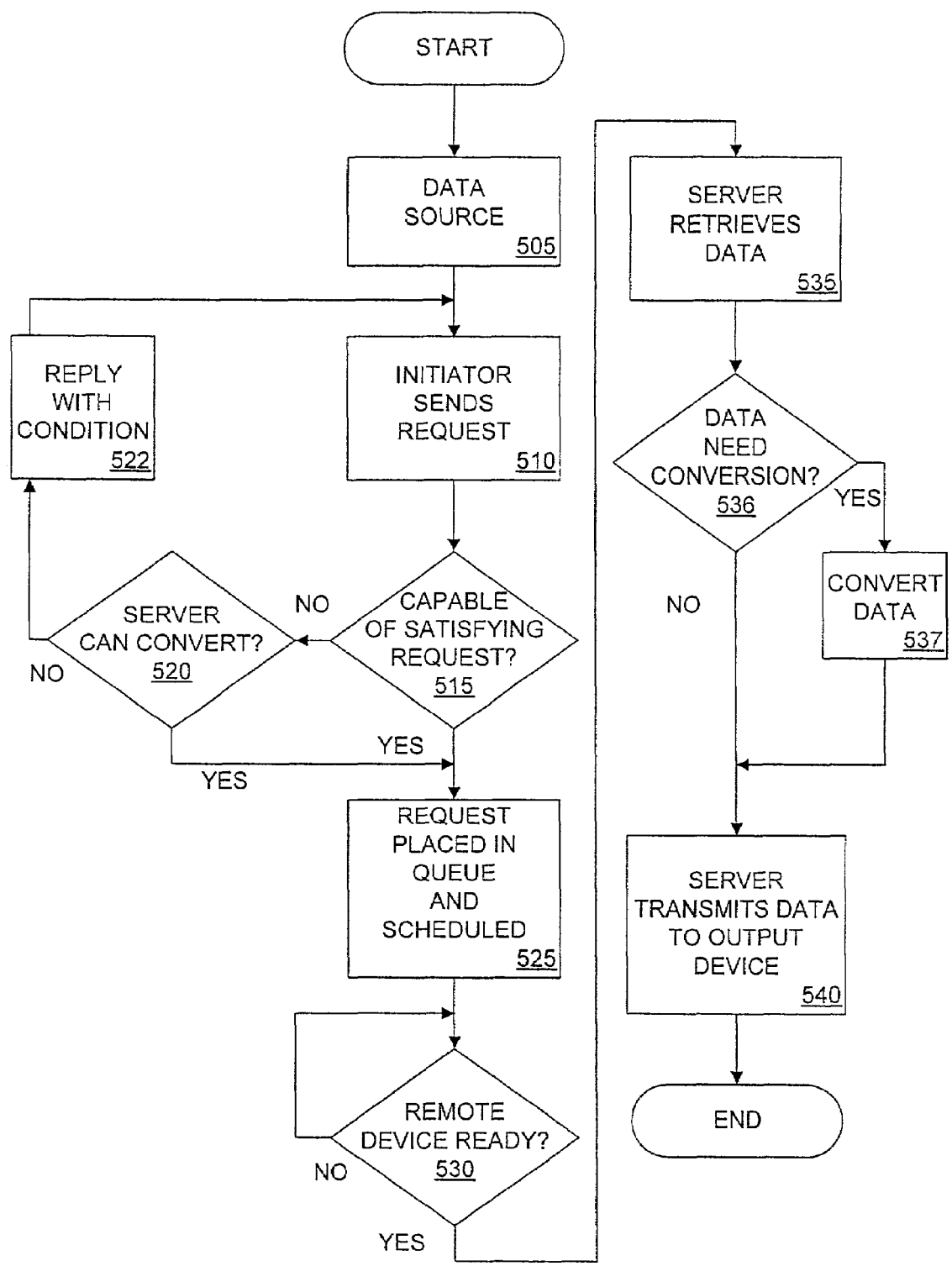
FIG. 5 is a flow diagram of operations performed to output to an output device consistent with the present invention.
Figure 6:
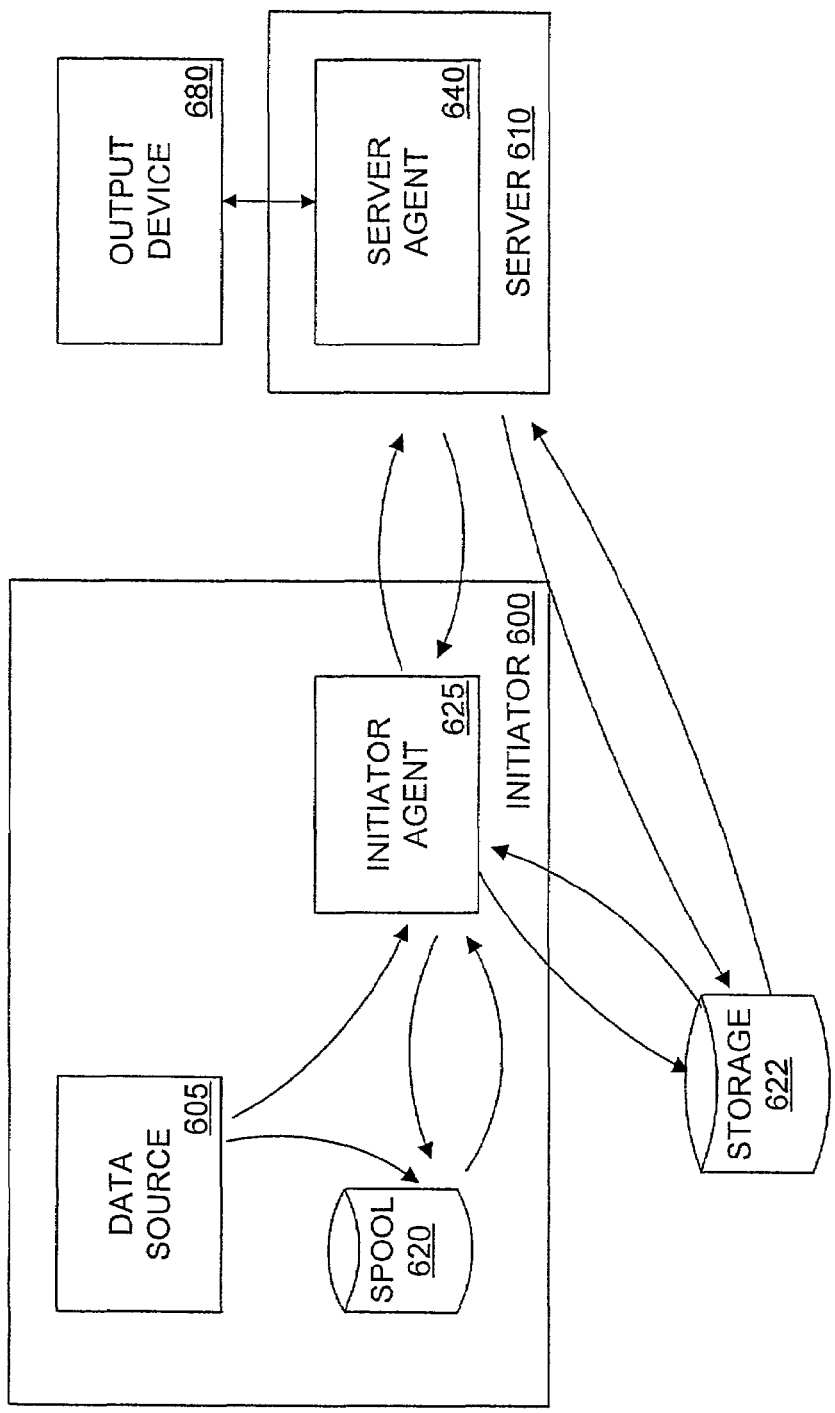
FIG. 6 is a data flow diagram consistent with the present invention.
Figure 7:
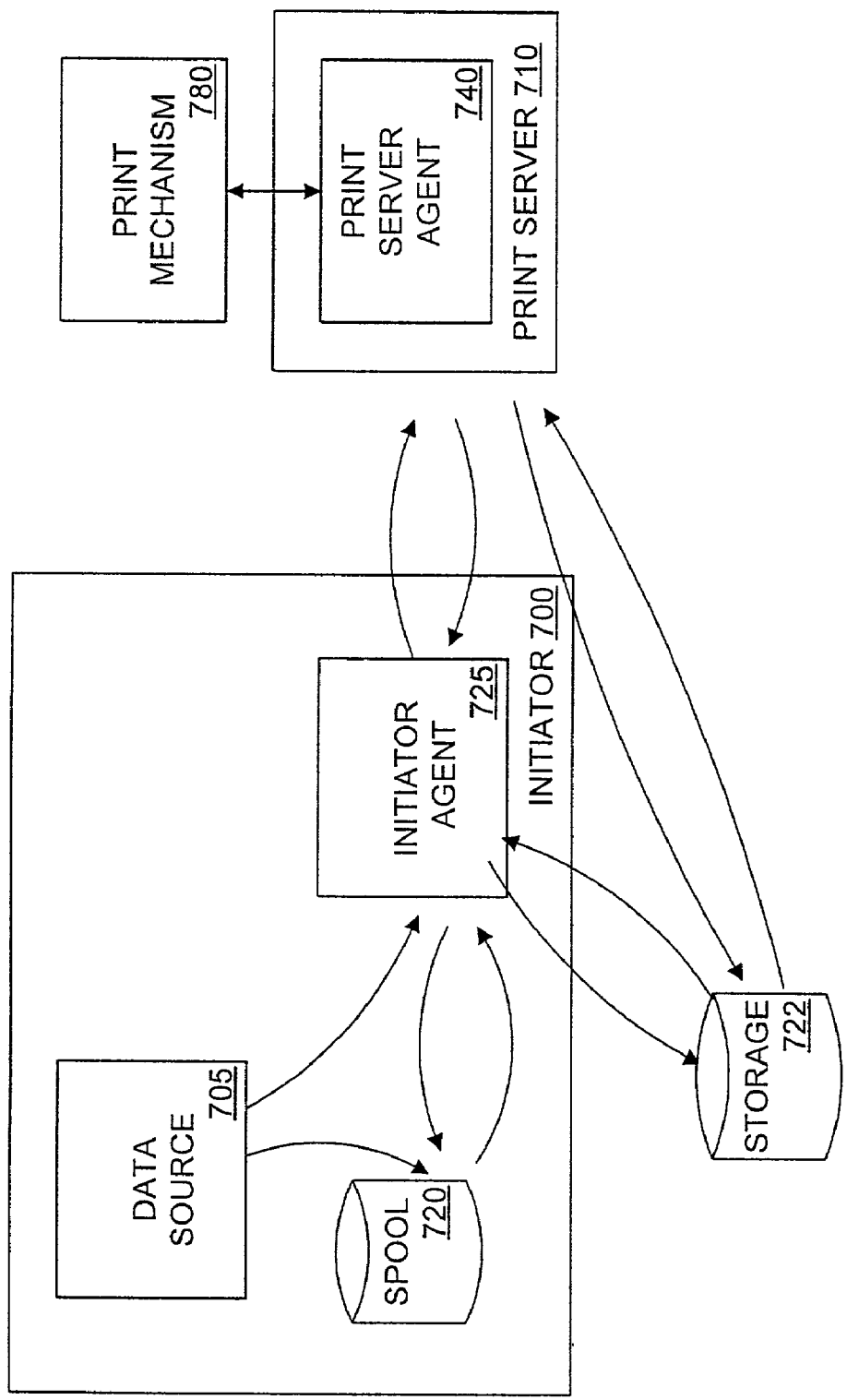
FIG. 7 is a data flow diagram of network printing consistent with the present invention.

The I/O systems described above may be used to implement methods of controlling access to I/O devices consistent with the present invention. FIG. 5 illustrates steps of a method of outputting data consistent with the present invention. FIG. 6 shows a data flow diagram illustrating the flow of data consistent with the method of FIG. 5. The steps of the method of FIG. 5 are described in more detail below with reference to the system depicted in FIG. 3 and the data flow diagram of FIG. 6. FIG. 7 illustrates one embodiment of the method of FIG. 5 in which the I/O device is a printer.

Figure 8:
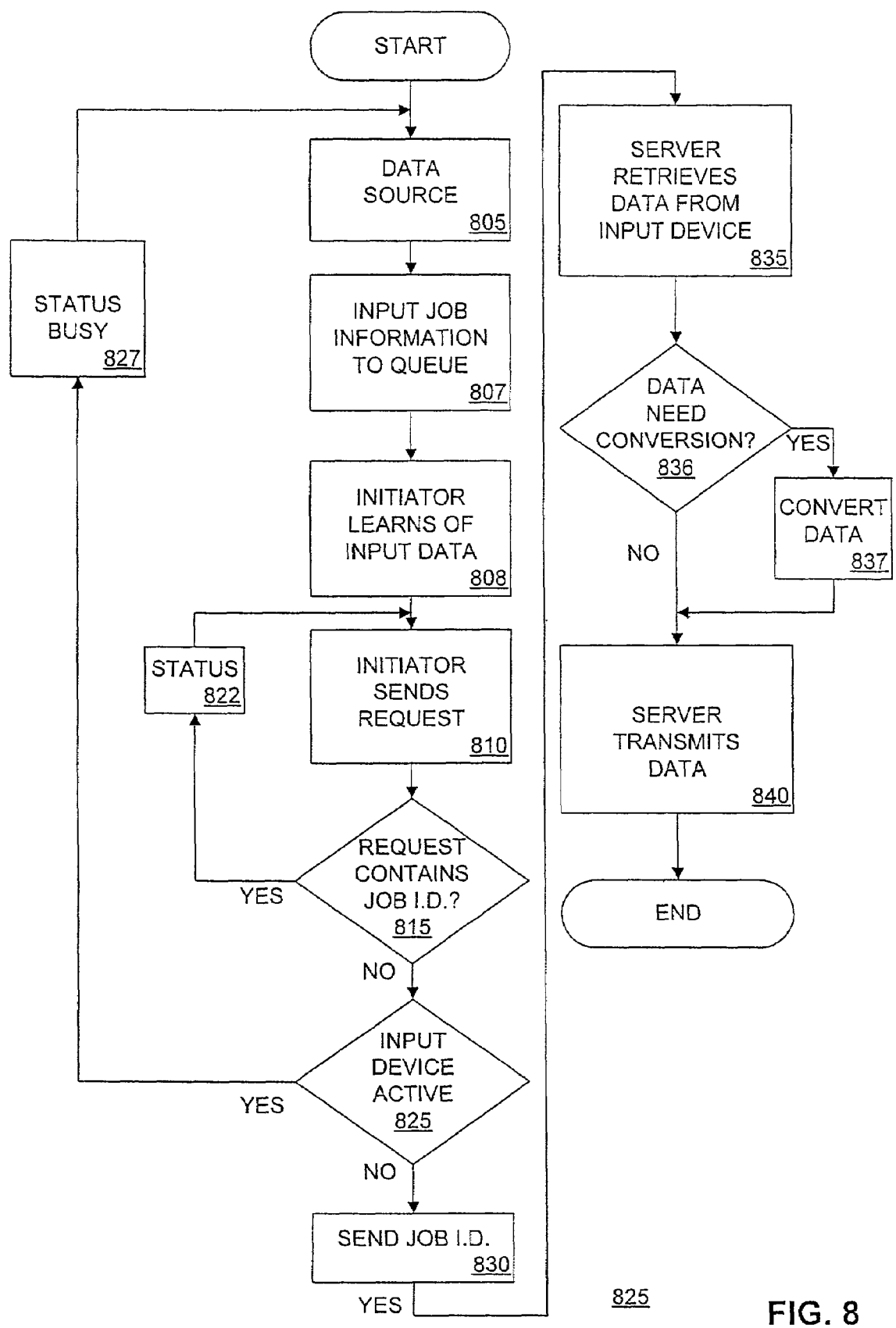
FIG. 8 is a flow diagram of operations performed to retrieve data from an input device consistent with the present invention.
Figure 9:
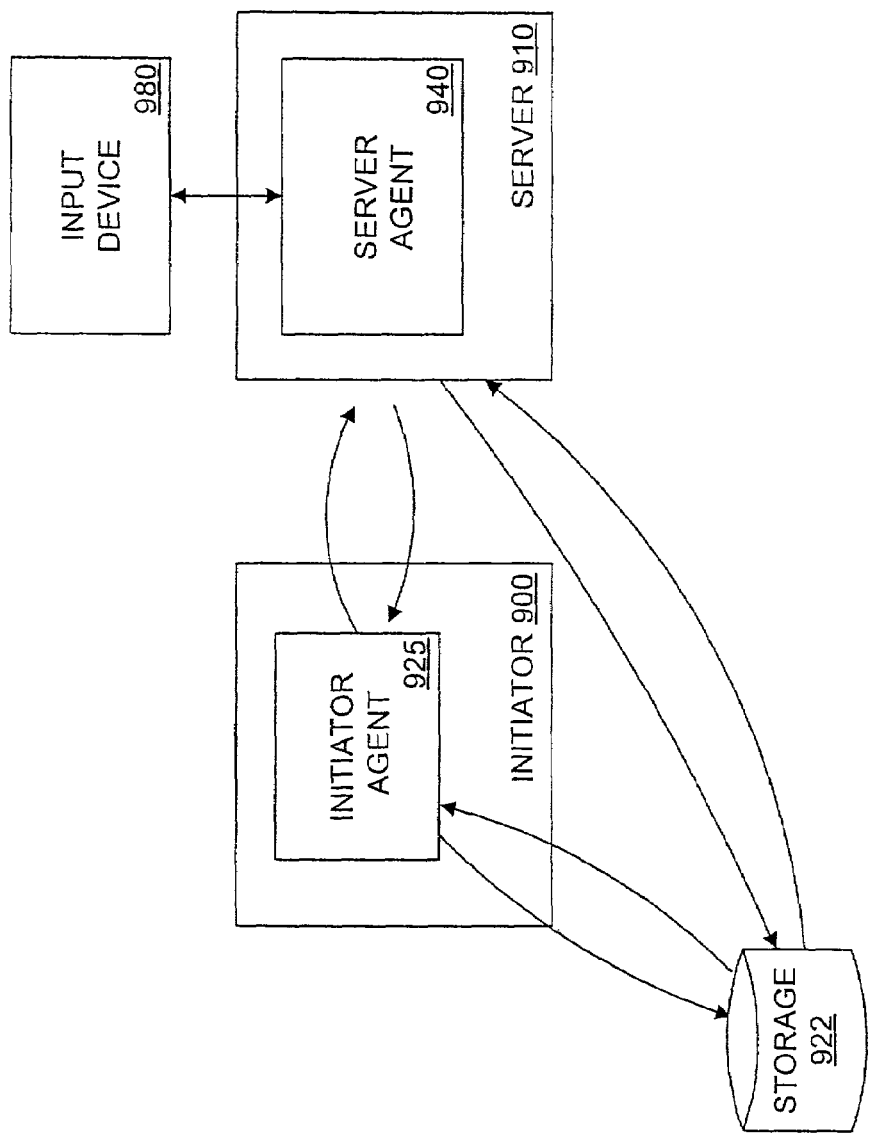
FIG. 9 is a data flow diagram consistent with the present invention.

FIG. 8 illustrates steps of a method of receiving data from an input device consistent with the present invention. FIG. 9 shows a data flow diagram illustrating the flow of data consistent with the method of FIG. 8. The steps of the method of FIG. 8 are described in more detail below with reference to the system depicted in FIG. 3 and the data flow diagram of FIG. 9. The method of FIG. 8 can be implemented for receiving data from an input device, such as a scanner, fax, or digital camera.

B. Outputting to an Output Device

With reference to FIGS. 5 and 6, the method begins with an initiator remote from the server providing data to be output (step 505). As shown in FIG. 6, data may be generated by data source 605 of initiator 600, which is remote from server 610, or initiator 600 may provide the data by, for example, reading previously generated data from a disk or other computer-readable medium. Initiator 600 may be, for example, client 305 of FIG. 3. Referring again to FIG. 6, the data is conditioned into the proper format by, for example, adding formatting commands or other information. The conditioned data may then be stored locally in, for example, spool 620 of initiator 600 or in another physical location, such as storage 622, which may be a file server operatively connected to a network and capable of communicating with initiator 600. Concurrently, data source 605 notifies initiator agent 625 that the data is ready for use and gives initiator agent 625 the location where the data is stored. Initiator agent 625 may be, for example, an HTTP client.

Initiator 600 then submits a request to server 610, which may be, for example, server 310 of FIG. 3 (step 510). If the output device has an embedded server, initiator 600 may submit the request directly to I/O device 350. Initiator agent 625 of initiator 600 formulates the request as an HTTP "POST" command. The POST command contains a URL of the location of the data to be outputted. The body of the request contains the page/request. The page/request may be encoded using MIME, in which case the lines following the command might include ContentType and authentication headers, to prove the initiator has permission to perform the requested operation. The POST request may also include information about the requirements such as the destination output device, output format type, and other special requirements. Alternatively, a user may invoke a browser or custom HTTP client to submit the same information as the POST command to the server.

Referring again to FIG. 5, the server receives the request and determines whether it is capable of satisfying the request (step 515). Server 310 of FIG. 3 may determine whether it is capable of outputting to the device requested and whether it has available storage space in the queue. There are many circumstances in which a server, like server 310, may not be capable of handling the request. The server, for example, may not be connected via the network to the device requested. The server may also recognize that the request specifies a particular output format, such as PostScript, and that none of the devices with which it has connectivity is capable of outputting in the requested output type.

If the server can handle the request, it responds and acknowledges the request, such as by transmitting a status line telling the initiator that it has received the request, placing the request in a queue, or by scheduling the request (step 525). If the server cannot handle the request in its current form, the server determines whether it can convert the request into a request that it can satisfy (step 520). For example, if the initiator requested that the data be output in a format that is not supported, the server may recognize that it can convert the data into the requested format or can obtain via the network the necessary tools for converting the request (such as conversion software). If the server can convert the data into a proper form, the server acknowledges the request (step 525).

If the server determines that it cannot handle the request, the server sends back an acknowledgment that it received the request but cannot accommodate it at this time (step 522). At this point, the process may be terminated or the process may be configured so that the client continues to post requests until the job is accepted by the server. If so, the process would continue from step 510.

If the request is scheduled, the initiator posts the job to a memory structure or "queue" (step 525). The job posting consists of the URL of the data output file which is stored in a location other than the queue. The server periodically monitors the output queue. Server agent 640 accesses the queue and adds, controls, and removes jobs from the queue. If the queue has jobs for output devices, and the output device is ready (step 530), the server retrieves the data from the storage location designated by the URL (step 535).

The server fetches the data using the URL (step 535), for example, by executing an HTTP GET object request. As shown in FIG. 6, server agent 640 of server 610 may transmit the request to initiator agent 625 of initiator 600, which may access data stored in spool 620. In another example, server agent 640 of server 610 transmits a GET request directly to storage 622, which may be, for example, a file server remote to initiator 600 and server 610. The amount of data that the server gets at any one time may depend on the capabilities of the output device for which the data is destined. If, for example, the output device is a serial device, a GET request may obtain only a small block of data. If the output device is a page-oriented device, such as a laser printer, the GET request may bring back data one page at a time. There are instances where the GET request may copy and bring back the entire output file. If the output device needs to output multiple copies of a large file, for example, the output process may be quicker if the destination client retrieves a copy of the entire output file rather than make multiple requests one page at a time.

If the data needs conversion (step 536), the server may convert the data (step 537) before sending it to output device 680 (step 540). If the data does not need conversion, the server simply transmits it to output device 680 (step 540). The transfer may be by parallel interface or other suitable interface such as USB, RS 232, or 1394 interfaces, or by a network or internet. Transfer may also be via internal proprietary CPU bus or a standard bus.

Methods consistent with the present invention allow data storage to be distributed over the network thereby reducing the need for any one device, such as a server, to possess large amounts of disk space. By storing data across more locations on the network and retrieving data to be outputted or inputted when needed from its storage location, network operation is more efficient. The initiator will know whether the output device is capable of handling the output request prior to commencing the job.

C. Network Printing

The outputting method of the present invention may also be described with reference to network printing. As shown in FIG. 5, the method begins with an initiator remote from the print server providing data to be printed (step 505). In FIG. 7, like FIG. 6, data source 705 of initiator 700 provides the data to be printed by, for example, generating the data or reading previously generated data from a disk or other computer-readable medium. Referring again to FIG. 7, the data is conditioned into the proper format by, for example, adding formatting commands or other information. The conditioned data is stored and data source 705 gives initiator agent 725 the location where the data is stored. Initiator agent 725 may be, for example, an HTTP client.

Initiator 700 then submits a request to print server 710, which may be, for example, server 310 of FIG. 3 (step 510). If the output device is a printer with embedded server or controller, similar to I/O device 350 of FIG. 3, initiator 700 may submit the request directly to the enhanced printer. Initiator agent 725 of initiator 700 formulates the request as an HTTP "POST" command containing a URL of the location of the data to be printed. The POST request may also include information about the printer, printer format types, and other special requirements. Alternatively, a user may invoke a browser or custom HTTP client to submit the same information as the POST command to print server 710.

Referring again to FIG. 5, the server receives the request and determines whether it is capable of satisfying the request (step 515). Print server 710 may determine whether it is capable of printing to the device requested and whether it has available storage space in the queue. If print server 710 can handle the request, printer server agent 740 responds and acknowledges the request, such as by transmitting a status line telling the initiator that it has received the request, placing the request in a queue, or by scheduling the request (step 525). If print server 710 cannot handle the request in its current form, print server 710 determines whether it can convert the request into a request that it can satisfy (step 520). For example, if the initiator requested that the data be printed in a format that is not supported, print server 710 may recognize that it can convert the data into the requested format or can obtain via the network the necessary tools for converting the request (such as conversion software). If print server 710 can convert the data into a proper form, print server 710 acknowledges the request (step 525).

If print server 710 determines that it cannot handle the request, print server 710 sends back an acknowledgment that it received the request but cannot accommodate it at this time (step 522). At this point, the process may be terminated or the process may be configured so that the client continues to post requests until the job is accepted by print server 710. If so, the process would continue from step 510.

If the request is scheduled, the initiator posts the job to a memory structure or "queue" (step 525). The job posting consists of the URL of the data output file which is stored in a location other than the queue. Print server 710 periodically monitors the output queue. Server agent 740 accesses the queue and adds, controls, and removes jobs from the queue. If the queue has jobs for a printer, and the printer is ready (step 530), the server retrieves the data from the storage location designated by the URL (step 535).

The server fetches the data using the URL (step 535), for example, by executing an HTTP GET object request. As shown in FIG. 7, server agent 740 of print server 710 may transmit the request to initiator agent 725 of initiator 700, which may access data stored in spool 720. In another example, server agent 740 of print server 710 transmits a GET request directly to storage 722, which may be, for example, a file server remote to initiator 700 and print server 710. The amount of data that the server gets with at any one time may depend on the capabilities of the printer for which the data is destined. If, for example, the printer is a serial device, a GET request may obtain only a small block of data. If the printer is a page-oriented device, such as a laser printer, the GET request may bring back data one page at a time. There are instances where the GET request may copy and bring back the entire output file. If the printer needs to output multiple copies of a large file, for example, the output process may be quicker if the destination client retrieves a copy of the entire output file rather than make multiple requests one page at a time.

If the data needs conversion (step 536), the server may convert the data (step 537) before sending it to print mechanism 780 (step 540). If the data does not need conversion, the server simply transmits it to print mechanism 780 (step 540). Print mechanism 780 may be, for example, a printer engine unit that converts data to printed pages. The transfer may be by parallel interface or other suitable interface such as USB, RS 232, or 1394 interfaces, or by a network or internet. Transfer may also be via internal proprietary CPU bus or a standard bus.

Methods consistent with the present invention allow data storage to be distributed over the network thereby reducing the need for any one device, such as a server, to possess large amounts of disk space. By storing data across more locations on the network and retrieving data to be outputted or inputted when needed from its storage location, network operation is more efficient. The initiator will know whether the printer is capable of handling the output request prior to commencing the job and less paper will be wasted by printing improperly formatted print jobs.

D. Inputting from an Input Device

The I/O systems described above may also be used to control an input device that receives or generates data. FIG. 8 also illustrates an example of a method of receiving data from an input device, such as a scanner, digital video camera, or fax. The steps of the method are illustrated with reference to the systems depicted in FIG. 3 and the data flow diagram of FIG. 9.

Consistent with the present invention, the method begins with the generation of data at the input device (step 805), such as by putting a document on a scanner, turning on a video camera, or receiving a signal indicating an incoming fax. Receipt of input data therefore generally begins with the input device 980 of FIG. 9. Input device 980 will convert the received images to digital data and may also store the data to a location in input device 980, server 910, or another accessible storage location. Input device 980 may also accept a list of addresses to which the device would like to transfer the input data. For example, input device 980 may be a digital fax machine that accepts a document, converts it to digital data, and allows the user to input various network addresses that would like to receive the faxed information.

Input device 980 notifies the server that input device 980 has data to transmit by, for example, transmitting input job information to the server. The input job information may contain such information as format type or destination, such as a list of storage addresses or a list of recipients. Server 910 stores the input job information to an input queue (step 807). Initiator 910 may learn that information is available at input device 980 by, for example, receiving notice from server 910 or periodically checking the input queue (step 808).

To get the data from input device 980, initiator 900 sends a request to server 910 based on the input job information (step 810). Initiator agent 925 of initiator 900 formulates the request as an HTTP "GET" command containing a URL of the location of the data to be retrieved. The body of the request contains the page/request. The page/request may be encoded using MIME, in which case the lines following the command might include ContentType and authentication headers to prove the initiator has permission to perform the requested operation. The GET request may also include information about the requirements such as the input device, input format type, and other special requirements. Alternatively, a user may invoke a browser or custom HTTP client to submit the same information as the GET command to the server.

Server 910 receives the request. If the GET request contains a job identifier (step 815), server agent 940 either returns the status of the job to initiator 900 (step 822) or executes the GET request.

If the request does not specify a job identifier (step 815), server 910 recognizes the request as a new request. Server 910 then queries input device 980 for data by invoking server agent 940, which may be, for example, a process or CGI script. If input device 980 is active (step 825), input device 980 is currently satisfying a different job and is unavailable. Server agent 940 returns a "busy" status to initiator 900 (step 827).

If input device 980 is inactive (step 825), server agent 740 responds to initiator 900 with a job identifier (step 830). Server agent 940 then retrieves data from input device 980, for example, by executing an HTTP GET object request (step 835). The amount of data that server 910 receives with any one request may depend on the capabilities of the input device for which the job is destined. If, for example, the input device is a serial device, a GET request may obtain only a small block of data. If the input device is a page-oriented device, such as a laser printer, the GET request may bring back data one page at a time. Additionally, there are instances where the GET request may copy and bring back the entire input file. If the input device needs to input multiple copies of a large file, for example, the input process may be quicker if the destination client retrieves a copy of the entire input file rather than make multiple requests one page at a time.

Figure 10:
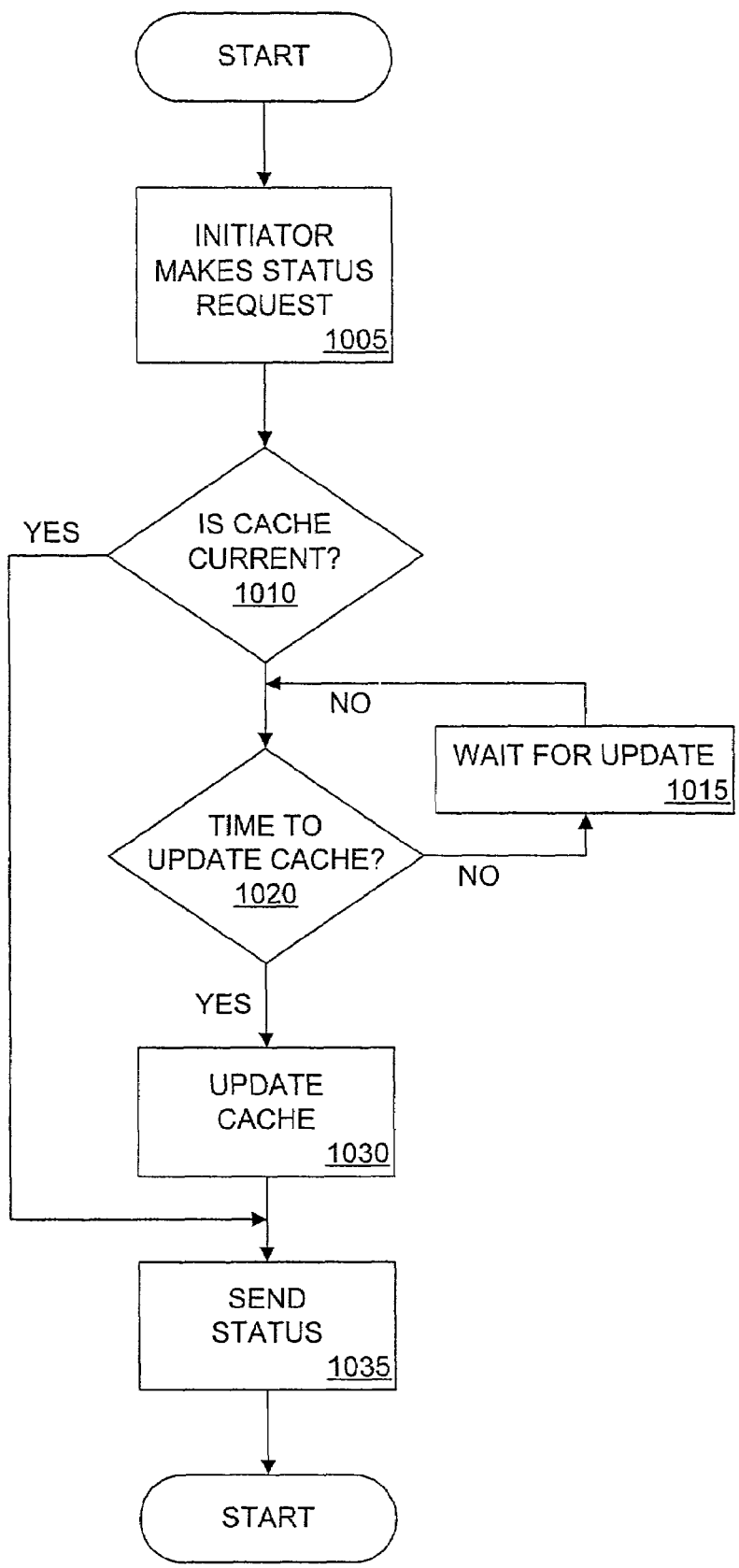
FIG. 10 is a flow diagram of operations performed to obtain status information consistent with the present invention.

Server 910 receives the data and determines whether the data needs conversion to the format requested by initiator 900 (step 836). If the data needs to be converted, server 910 converts the data (837). Server 910 transmits the data to a destination based either on the input job information or the request from the initiator (step 840). The transfer may be by parallel interface or other suitable interface such as USB, RS 232, or 1394 interfaces. The E. Querying for Status Using an HTTP protocol for communications between an initiator and a server, an initiator may also query the server (or an I/O device with embedded server) for status of the I/O request or the I/O device. FIG. 10 illustrates the steps of requesting and receiving status reports.

To obtain status, initiator 600 or 900 makes a status request (step 1005) including, for example, job identifier, information containing in the I/O request, or information identifying the I/O device (output device 680 or input device 980). In an HTTP environment, the status request may be made in the form of a GET request to a server, such as server 610 in FIG. 7 or server 910 in FIG. 9. The GET request may also be followed by header information that asks the server to send only that data that has been modified since the last status request.

Consistent with the present invention, status information is stored in a status information cache on the I/O server. Frequently contacting an I/O device for status may interrupt or slow data transfer, particularly if status is checked very frequently. Use of a status cache can control interruptions to I/O devices and improve performance. The cache is updated during idle states or when there is an error at the I/O device that prevents data transfer. Another advantage of caching status information on the server is that the server administrator can define the rules for updating the status cache and the frequency of status queries to the I/O device.

Before providing the initiator with status, the I/O server may check to see if the status cache contains current status information (step 1010). The server may, for example, compare the time on the request to see if the cache has been updated since the last status request. If the cache is current, the server may send the status information from the cache (step 1025).

If the status information is not current, the server determines whether it is an appropriate time to update the status cache. If not, the server may wait for an update (step 1015) or send the information that is in the cache. If, however, the server has not queried the I/O device in a long time, or if the server detects that the I/O device is inactive, the server may update the cache by querying the I/O device for status (step 1020).

The I/O server then formats a reply containing the status of the I/O device and transmits the information to the initiator (step 1025).

Conclusion

As described in detail above, methods and apparatus consistent with the present invention operate in a network environment having an initiator, a server, and an I/O device. The initiator requests a server to perform an input/output transactions and negotiates the specifics of the transaction with the server. When the request is ready to be initiated, the server "pulls" the data from one location and sends it to another. The foregoing description of an implementation of the invention has been presented for purposes of illustration and description. Modifications and variations are possible in light of the above teachings or may be acquired from practicing the invention.

Although systems and methods consistent with the present invention are described as operating in the exemplary distributed system, one skilled in the art will appreciate that the present invention can be practiced in other systems and programming environments. The scope of the invention is therefore defined by the claims and their equivalents.

What is claimed is:

1. A network printing system comprising:
a printing device having access to a network, and effective for receiving print requests over said network;
a client device having access to said network, and effective for submitting a first print request for a print job to said printing device over said network;
wherein said printing device accepts said first print request and stores it in a queue;
wherein said printing device initiates the downloading of said print job for printing and
wherein said first print request specifies a printing format for said print job, and if said print job is not currently in said specified printing format, then said printing device converts said print job into said specified printing format prior to printing.

2. The network printing system of claim 1, wherein said printing device waits until it is ready to execute said first print request before downloading said print job for printing.

3. The network printing system of claim 1, wherein:
said network is the Internet; and
said client device is remote from said printing device.

4. The network printing system of claim 3, wherein said printing device downloads said print job using HTTP communication protocols.

5. The network printing system of claim 1 further comprising:
a memory store remote from said client device and said printing device, said memory store being accessible over said network; wherein
said client device stores said print job in said memory store, and includes storage location information of said print job within said first print request; and
said printing device uses said storage location information to download said print job from said memory store over said network.

6. The network printing system of claim 1, wherein if said printing device does not have a conversion capability suitable for converting said print job into said specified printing format, then said printing device locates and downloads over said network the required conversion means for converting said print job into said specified printing format.

7. The network printing system of claim 1, wherein said printing device has direct access to said network.

8. The network printing system of claim 1, wherein said printing device has indirect access to said network through a network-access computing device.

9. An internet printing system comprising:
a printing device having communication access to the internet, and effective for receiving print requests over the internet;
a first computing device remote from said printing device and having access to the internet, said first computing device being effective for submitting a first print request for a print job to said printing device over the internet;
wherein said printing device accepts said first print request and stores it in a queue;
wherein said printing device uses HTTP communication protocols to initiate the downloading of said print job for printing, and
wherein said first print request specifies a printing format for said print job, and if said print job is not currently in said specified printing format, then said printing device converts said print job into said specified printing format prior to printing.

10. The internet printing system of claim 9, wherein said printing device waits until it is ready to execute said first print request before downloading said print job for printing.

11. The internet printing system of claim 9, wherein said printing device uses an HTTP GET object request to download said print job.

12. The internet printing system of claim 9, wherein first computing device uses an HTTP POST command to submit said print request to said printing device.

13. The internet printing system of claim 9, wherein said printing device downloads said print job from said first computing device.

14. The internet printing system of claim 9 further comprising:
a memory store remote from said first computing device and from said printing device, said memory store being accessible over the internet; wherein
said first computing device stores said print job in said memory store, and includes storage location information of said print job within said first print request; and
said printing device uses said storage location information to locate and download said print job from said memory store over the internet.

15. The internet printing system of claim 9, wherein if said printing device does not have a conversion capability suitable for converting said print job into said specified printing format, then said printing device locates and downloads over the internet the required conversion means for converting said print job into said specified printing format.

16. The internet printing system of claim 9, wherein said printing device has direct access to the internet.

17. The network printing system of claim 9, wherein said printing device has indirect access to the internet through a second computing device.

18. An internet printing system comprising:
a printing device having communication access to the internet;
a network server having communication access to the internet, and effective for receiving print requests over the internet;
a client computing device having communication access to the internet, said first computing device being effective for submitting a first print request for a print job to said network server over the internet;
wherein said network server accepts said first print request and stores it in a queue;
wherein said network server uses HTTP communication protocols to initiate the downloading of said print job for printing and to convey the print job over the internet to said printing device; and
wherein said first print request specifies a printing format for said print job, and if said print job is not currently in said specified printing format, then said network server converts said print job into said specified printing format prior conveying it to said printing device.

19. The internet printing system of claim 18, wherein said client computing device is remote from said network server and said printing device, and wherein said network server is remote from said printing device.

20. The internet printing system of claim 18, wherein said network server waits until said printing device is ready to execute said first print request before downloading said print job for printing.

21. The internet printing system of claim 18, wherein said networks server uses an HTTP GET object request to download said print job.

22. The internet printing system of claim 18, wherein client computing device uses an HTTP POST command submit said print request to said network server.

23. The internet printing system of claim 18, wherein said network server downloads said print job from said client computing device.

24. The internet printing system of claim 18 further comprising:
   a memory store accessible over the internet and remote from said client computing device, network server, and printing device; wherein
   said first computing device stores said print job in said memory store, and includes storage location information of said print job within said first print request; and
   said network server uses said storage location information to locate and download said print job from said memory store over the internet.

25. The internet printing system of claim 18, wherein if said network server does not have a conversion capability suitable for converting said print job into said specified printing format, then said network server locates and downloads over the internet the required conversion means for converting said print job into said specified printing format.

26. A network data transfer system comprising:
   a communication network;
   a data input device for generating input data, and for issuing a notification message in response to newly generated input data, wherein said first notification message includes the address of at least one destination computing device;
   a first computing device in communication with said data input device and having access to said communication network; and
   a second computing device having access to said communication network, wherein said second computing device responds to being identified as said at least one destination computing device by initiating the downloading of said newly generated input data over said communication network;
   wherein said second computing device specifies a desired format for said newly generated input data prior to downloading said newly generated input data, and if said newly generated input data is not currently in said specified desired format, then said first computing device converts said newly generated input data into said desired specified format prior conveying it to said second computing device.

27. The network data transfer system of claim 26, wherein said first computing device sends a second notification notice to said second computing device in response to said first notification notice identifying said second computing device as said at least one destination device.

28. The network data transfer system of claim 26, wherein said first notification notice identities a plurality of destination devices and said first computing devices sends said second notification notice to each of said plurality of destination devices.

29. The network data transfer system of claim 28 wherein said data input device is effective for receiving a target list of device addresses, and said plurality of destination devices are determined by said target list.

30. The network data transfer system of claim 26, wherein said communication network is the internet, and said second computing device uses HTTP communication protocols to initiate the downloading of said newly generated input data.

31. The network data transfer system of claim 26, wherein said second computing device is remote from said first computing device.

32. The network data transfer system of claim 26, wherein said second computing device downloads said newly generated input data directly from said first computing device over said communication network.

33. The network data transfer system of claim 26, further comprising:
   a memory store accessible over said communication network and remote from said first and second computing devices; wherein
   said first computing device stores said newly generated input data in said memory store, and conveys storage location information for locating the stored input data to each of said destination device; and
   said second computing device uses said storage location information to locate and download the stored input data from said memory store over said communication network.

34. The network data transfer system of claim 26, wherein if said first computing device does not have a conversion capability suitable for converting said newly generated input data into said specified desired format, then said second computing device locates and downloads over the internet the required conversion means for converting said newly generated input data into said specified printing format.

35. The network data transfer system of claim 26, wherein said data input device is one of a scanner, digital camera, and facsimile machine.

* * * * *